O. H. JADWIN.

Supporting-Pulley for Traveling-Cable.

No. 8,619. Reissued Mar. 11, 1879.

WITNESSES:

W. W. Hollingsworth

Edw. W. Byrn.

INVENTOR:

O. H. Jadwin

BY

ATTORNEYS.

N. PETERS, PHOTO-LITHOGRAPHER, WASHINGTON, D. C.

UNITED STATES PATENT OFFICE.

ORLANDO H. JADWIN, OF BROOKLYN, NEW YORK.

IMPROVEMENT IN SUPPORTING-PULLEYS FOR TRAVELING CABLES.

Specification forming part of Letters Patent No. 195,509, dated September 25, 1877; Reissue No. 8,619, dated March 11, 1879; application filed January 18, 1879.

*To all whom it may concern:*

Be it known that I, ORLANDO H. JADWIN, of Brooklyn, in the county of Kings and State of New York, have invented a new and useful Improvement in Accommodating Guide-Pulleys for Traveling Cables; and I do hereby declare that the following is a full, clear, and exact description of the same.

My invention relates to the propulsion of cars, boats, and other bodies through the instrumentality of a traveling cable and a griping attachment, located on the car or other body, adapted to seize the cable to communicate the motion thereof to the said car or body.

The improvement consists in an arrangement of accommodating guide-pulleys for sustaining and guiding the cable, whereby a knot, swivel, or other bulky attachment on the cable or the griping attachment from the car is enabled to ride over with ease.

Figure 1:
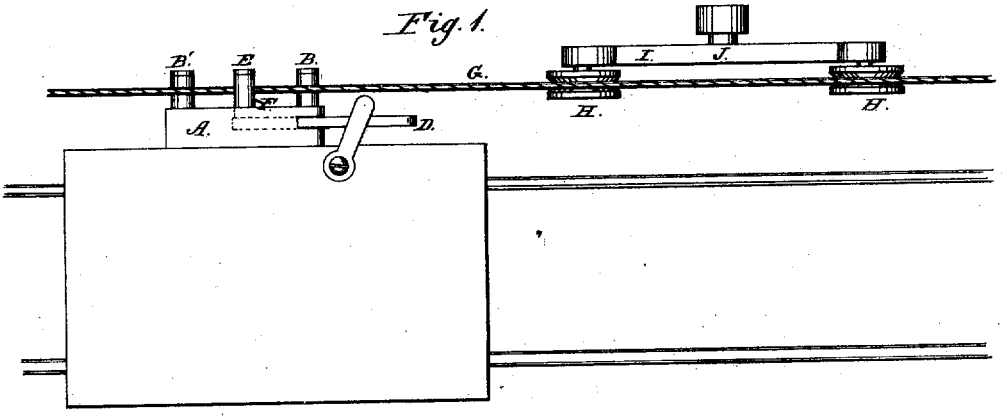
Figure 2:
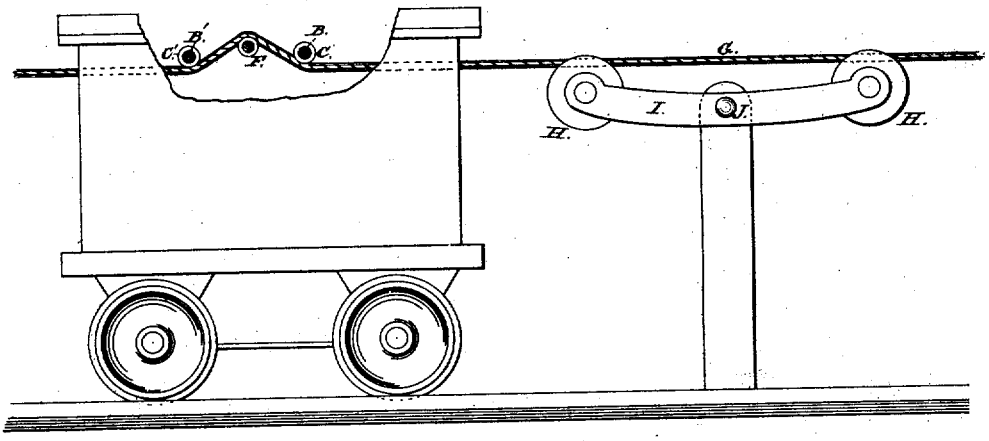
Figure 3:
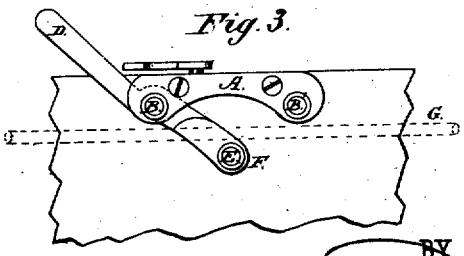

Figure 1 represents a plan, showing a car in position. Fig. 2 is a side elevation, with a portion of the car broken away to show its connection with the cable; and Fig. 3 is a detail view of one form of griping attachment which may be used for connecting the car with the cable.

Similar letters of reference indicate corresponding parts.

G represents an endless traveling cable, designed to be kept in constant motion, and supported at intervals by means of accommodating pulleys H H, located upon a rocking frame or lever, I, upon opposite sides of its pivot or fulcrum J.

Now, when the griping attachment on the car, the knot or swivel on the cable, or other bulky attachment arrives at a set of these accommodating pulleys the attachment or obstruction strikes the first pulley, which, in moving laterally away from the cable, causes the pulley at the other end of the frame to advance to a firmer bearing against the cable, thus securely holding the cable in its proper position while the first pulley is being passed. Then as the griping attachment or obstruction reaches the second pulley of the rocking frame, the second pulley in being thrust laterally from the cable causes the first pulley at the opposite end of the rocking frame to advance to a better holding position against the cable while the second pulley is being passed.

If the cable were supported by a single pulley or roller of the ordinary form, the griping attachment or knot on the cable would be likely to unseat the cable from said pulley, and especially is this the case if the pulley is located at a corner or curve. With the arrangement of accommodating pulleys described, it will be perceived that the cable is always held by its support or guide, and it can never become displaced.

For connecting the car with the traveling-cable any approved means may be employed. To prevent sudden shock or jerk in starting the car, however, a griping connection like that shown in the drawings is well adapted. In the case here presented, A represents a casting attached to a car. B B′ are stationary wrist-pins, on which loose sleeves or rollers C C′ are set. D is a lever, whose fulcrum is at B, as shown in Figs. 1 and 3, and on whose lower end there is a wrist-pin, E, upon which a loose sleeve or roller, F, is set.

In operating this device it will be seen that by applying a downward pressure gently at first to the lever D it will cause the roller at its lower end to lift the cable against the upper rollers, C C′, and the cable, running between, gradually imparts motion to the car, and as the pressure on said lever is increased the momentum of the car will be increased until it attains nearly the same speed as the traveling cable.

Having thus described my invention, what I claim as new is—

A guide for a traveling cable, consisting of a rocking frame or lever having pulleys or rollers located upon opposite sides of its fulcrum, substantially as and for the purpose described.

ORLANDO H. JADWIN.

Witnesses:

EDWD. W. BYRN,

SOLON C. KEMON.